July 18, 1961 M. S. SUTTON 2,992,541
REFRIGERATION CONTROL SYSTEM
Filed Feb. 26, 1958 2 Sheets-Sheet 1
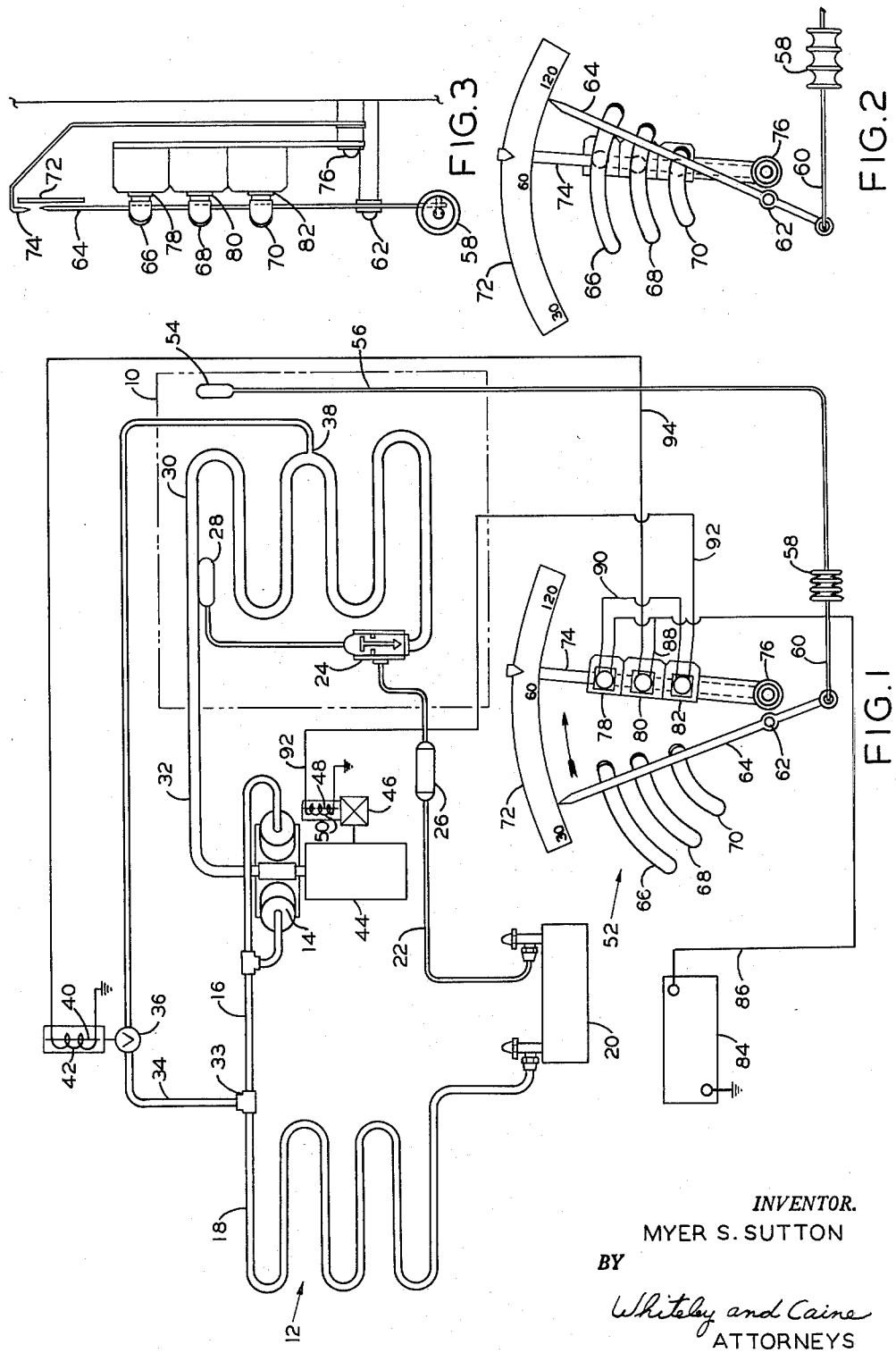
INVENTOR.
MYER S. SUTTON
BY
Whiteley and Caine
ATTORNEYS INVENTOR.
MYER S. SUTTON
BY
Whitely and Caine
ATTORNEYS

United States Patent Office 2,992,541
Patented July 18, 1961

2,992,541
REFRIGERATION CONTROL SYSTEM
Myer S. Sutton, Minneapolis, Minn., assignor to Thermo-King Corporation, Minneapolis, Minn., a corporation of Minnesota
Filed Feb. 26, 1958, Ser. No. 717,678
8 Claims. (Cl. 62—117)

This invention relates to improvements in method and apparatus for maintaining a substantially uniform temperature within an enclosure. In general, the invention is concerned with the preservation of perishable products in transit. More particularly, the invention is concerned with the control of a continuously operated refrigeration apparatus to maintain a substantially uniform temperature within a space whose temperature is regulated by said apparatus.

In the prior art relating to the preservation of foodstuffs and other perishable products in transit by mechanical air conditioning means, the apparatus was operated on either a continuous or intermittent basis. In Reissue Patent 23,000, assigned to the assignee of this application, is disclosed a continuously operated apparatus. According to that patent, a prime mover in the form of an internal combustion engine was operated at full speed when refrigeration was required, and at lower or idling speed during those periods when the space temperature was below a predetermined minimum temperature. In Patent 2,337,164 is disclosed an intermittently operated system. According to this latter patent, the apparatus remains completely inactive when the space temperature is below a predetermined minimum, and the prime mover is energized on an intermittent basis only when additional refrigeration is required. The control of either of these prior systems is not effective to remedy the situation when the ambient temperature is lower than the desired temperature in the space, and is causing a further lowering of the space temperature.

In Patent 2,696,086 is disclosed an automatic system that responds to either a call for refrigeration to reduce the space temperature, or a call for heat when the ambient temperature is reducing the space temperature below a desired minimum.

In the present invention, the space temperature is maintained at a substantially uniform temperature by apparatus that is designed for continuous operation, and which alternately heats and cools the space, or vice versa. While the present arrangement requires the use of continuously operated apparatus and thus continuously consumes fuel or power, there are many circumstances under which such apparatus is desirable. One such application is in connection with the long distance hauling of perishable products by rail or transport means. Under these circumstances, the prime mover may be an internal combustion engine that is started before the initiation of the transit and which for simplicity of control is operated continuously. Frequently, prime movers of the diesel or compression ignition type are used for this purpose. The engine may be of either the compression ignition type, commonly referred to as a diesel type, or it may be of the spark ignition type. For various uses there are advantages in each type of engine. According to the present invention, the engine is continuously operated alternately at either maximum speed or a lower speed, and it in turn continuously operates a compressor disposed in a refrigeration system having a high pressure side and a low pressure side. When the space temperature which is in heat exchange relationship with the low pressure side of the refrigeration system is cooled below a predetermined minimum temperature, the fluid circuit within the system is modified so as to convert the cooling heat exchanger to a heating heat exchanger, thereby raising the temperature within the controlled space. When, as a result of such heating, the space temperature reaches a predetermined maximum temperature, the fluid circuit of the system is returned to its original condition and the space temperature is reduced. The invention comprises provision made for controlling the system to maintain a substantially uniform temperature within a reasonable range of temperatures, and the control also provides for heating the enclosed space when the ambient temperature is low and tends to reduce the space temperature below the predetermined desired minimum.

An object of the invention is to provide a method of heat exchange within an enclosed space by rapidly providing heat exchange with said space until the temperature therein approximates the desired temperature, and then continuously and alternately heating and cooling said space at a reduced rate to temperatures approximating the desired degree to maintain a substantially constant temperature therein.

Another object is to increase the rate of one form of heat exchange when the alternate forms of heat exchange fail to maintain a substantially constant temperature, because of a condition foreign to said heat exchange.

A further object is to provide in combination with a refrigeration system and a continuously operated prime mover for circulating the fluid within said system and a control system for controlling a portion of the fluid circuit and the prime mover to maintain a substantially uniform temperature within a controlled space.

Other and further objects may become apparent from the following specification and claims, and in the appended drawings in which:

FIG. 1 is a schematic diagram of a refrigeration circuit embodying one form of the present invention;

FIG. 2 shows a portion of a thermostat shown in FIG. 1 in an alternate position;

FIG. 3 is a side elevation of the thermostat shown in FIG. 2; and

Figure 4:
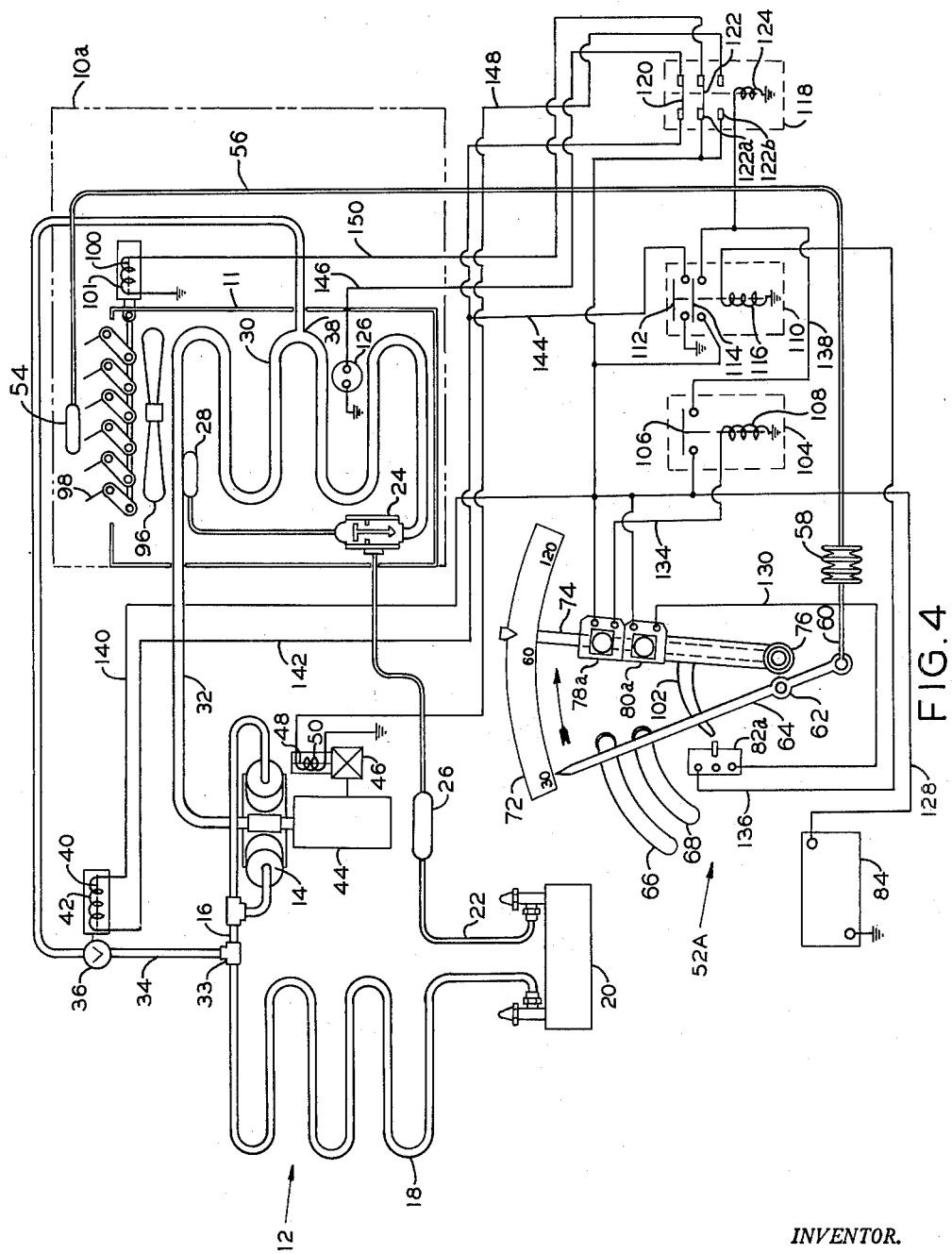
FIG. 4 is a modification of the invention disclosed in FIG. 1.

Operatively connected to the compressor 14 is a continuously operated prime mover 44, which is here disclosed as an internal combustion engine. The prime mover 44 is capable of a two-speed operation under the control of element 46, constituting a fuel throttle control having an armature 48 extending through an induction coil 50. While the motor 48, 50, when activated, is capable of operating the engine 44 at either a high speed or a low speed, as disclosed herein, said motor, when activated, operates the engine at low speed.

General reference numeral 52 indicates in its entirey a thermostatic control composed of a temperature responsive element 54 positioned in enclosure 10 and joined by a conduit 56 to a thermal motor 58. A rod 60 extends from the thermal motor 58 and is pivotally joined at 62 to a member 64 which carries three switch actuating cams designated at 66, 68 and 70. Member 64 is movable relative to an arcuate indicator 72 in response to a temperature change in space 10. A member 74 that is rotatably adjustable by a knob 76 forms a support for three switches designated at 78, 80 and 82. These three switches are disposed on member 74 in such a manner as to be individually actuated by the cams 66, 68 and 70, on member 64 when said latter member moves relative to member 74 and the arcuate scale 72.

A source of power designated as a battery 84 has a conductor 86 which extends to one pole of switch 78 and has a branch conductor 88 which extends to one pole of switch 80. A conductor 90 joins the other pole of switch 78 to one pole of switch 82. A conductor 92 extends from the other pole of switch 82 to the coil 50 of the control device 46. A conductor 94 extends from the other pole of switch 80 to the coil 42 of the valve 36. The switches 78 and 80 are in a closed circuit condition as disclosed in FIG. 1, and are actuated to an open circuit position by the cams 66 and 68 when the space temperature is above the setting of member 74 with respect to the index 72, as disclosed in FIG. 2. Switch 82 is in an open condition, as disclosed in FIG. 1, and is closed by the action of cam 70 in the condition disclosed in FIG. 2.

The operation of the unit disclosed in FIG. 1 will now be explained. Assuming member 74 to be in the position of FIG. 2, thereby indicating that the temperature in space 10 is above the preset temperature of space 10, switches 78 and 80 are open, and switch 82 is closed and the coils 42 and 50 are de-energized. Assuming also that the engine 44 is in operation, and that the control device 46 is causing the same to operate at full speed, under these conditions, the compressor 14 is supplying refrigerant to the condenser 18, where it is condensed and passes as a liquid to receiver 20, and the thermostatic bulb 28 has caused the expansion valve 24 to be in an open condition, whereby liquid refrigerant is being supplied to the inlet end of evaporator 30. The refrigerant will, under these conditions, be evaporating within the coil 30 and reducing the temperature thereof, and as bulb 54 senses this change in temperature, the member 64 will be caused to rotate in a counterclockwise direction with respect to the arcuate indicator 72. When the temperature indicated by member 64, relative to member 74, is reached, switch 78 will be released by cam 66 and closes to energize the motor 48, 50, and the engine 44 is caused to run at reduced speed, but the refrigeration system continues to reduce the temperature in space 10, but at a reduced rate. The rate of reduction of the temperature may be commensurate with heat leakage into space 10, or the heat evolved from the products. If, however, the temperature in space 10 continues to descend, member 64 will continue to move to the left to release switch 80, which energizes the coil 42 of valve 36, and hot gas from the high pressure side of the refrigeration system is permitted to flow from the T 33 through the conduit 34, passing through valve 36, and the junction 38 into the evaporator 30 to impart super heat from the compressed gas to the evaporator coil 30. This action causes the residue of refrigerant in the evaporator to rapidly evaporate, and coil 30 then becomes a heating heat exchanger to impart heat to the space 10. As the temperature of space 10 rises, the member 64 will again move to the right and switch 80 is actuated as member 64 moves in passing relationship to member 74 to actuate switch 80 and de-energize the motor 40, 42 of valve 36, thereby cutting off the flow of hot gas through the conduit 34 and in the normal course of operation, the coil 30 again becomes a refrigerant heat exchanger. In the manner described, the system will periodically cycle between heating and cooling, but with the engine running at reduced speed. Under normal conditions, operation continues in this manner, raising and lowering the temperature a few degrees on either side of a median representing the preset desired temperature. However, should the space temperature continue to descend as a result of low ambient temperature, the movement of member 64 to the left or away from member 74 causes the cam 70 to move away from switch 82, which closes a circuit through switches 78 and 82 to the throttle motor 48, 50, whence the engine 44 is caused to run at full speed with the valve 36 in an open position to supply heat in a larger volume to the space 10. This operation will continue until the temperature of space 10 is raised to within the desired range, whence the unit again cycles with respect to switch 80, but with the engine operating at reduced speed.

Referring now to the several figures of the drawings, in which like reference numerals indicate similar parts, the invention will be described in detail. Referring first to FIG. 1, reference character 10 designates an insulated enclosure, the space of which is to be maintained at a relatively uniform temperature for the preservation of perishable products. The enclosure 10 may be either warehouse or vehicle for the transportation of perishable products. General reference numeral 12 indicates in its entirety a refrigeration system. The system 12 includes a compressor 14 whose high pressure side is connected to a conduit 16 that extends to a condenser 18. The discharge side of condenser 18 is joined to a receiver 20. A conduit 22 extends from the receiver 20 to an expansion valve 24, and contains a dehydrator 26. The expansion valve 24 is controlled by a thermostatic element 28 and controls the flow of refrigerant fluid to an evaporator coil 30, which constitutes a refrigerant heat exchanger or the low pressure side of the refrigerating system. The evaporator 30 is connected by a conduit 32 to the low pressure side of compressor 14.

Extending from a T 33 in conduit 16 is a conduit 34 containing a two-position control valve 36. Conduit 34 is connected to the evaporator 30 at a junction 38. While the junction 38 is schematically disclosed as being substantially midway between the opposite ends of the evaporator, it is only essentially that junction 38 be disposed within the evaporator coil 30 between its opposite ends.

Valve 36 is a motorized valve having its moving part connected to an armature 40 that is surrounded by an induction coil 42.

Referring now to FIG. 4, is disclosed a modification of the invention which is particularly adapted for use on a transport vehicle that may be subject to substantial vibration, and which may be particularly adapted for the transportation of perishable food products. Two practical applications of transport vehicles to which this invention is applicable are disclosed in Patents 2,696,086 and 2,780,923.

Reference character 10a designates an insulated enclosure intended for the storage or transport of the perishable product. Within the interior of enclosure 10a is a separate compartment 11 that is open on its top and bottom surfaces so as to permit the passage of air to and from enclosure 10a. Within compartment 11 is the heat exchanger 30 of the refrigeration system 12, which in all general respects is similar to the system disclosed in FIG. 1.

In the arrangement disclosed in FIG. 4, a continuously operating fan 96 is disposed above the coil 30 so as to circulate the air in space 10a relative to coil 30. While a fan may be used in conjunction with the cooling coils of the disclosures of FIG. 1, in the arrangement of FIG. 4 provision is made for terminating the flow of air relative to the coil 30 during the period when hot gas is passing through coil 30, either for defrosting or heating. It will be recognized that if the circulation of air can be terminated during the heating cycle that the space temperature will remain virtually unchanged. To preclude movement of air relative to coil 30, a series of dampers 98 are positioned in the upper opening of compartment 11, and these dampers are normally open to permit passage of air over the evaporator 30. The dampers may be closed by an armature 10 that extends through the core of an induction coil 98.

An adjustable thermostat indicated by general reference numeral 32a is generally similar to thermostat 32, except that the adjustable setting member 74 carries a cam 102 that is adapted to engage a separably mounted switch. The three switches in this figure are designated as 78a, 80a and 82a.

To control the several mechanisms there is provided a first relay 104 having an armature 106 that moves with respect to a pair of contacts under the control of an induction coil 108. A second relay 110 has two normally open armature controlled switches 112, 114, that each move with respect to a pair of contacts under the control of an induction coil 116. A third relay 118 carries an upper normally closed switch 120, and a second switch 122 that moves between two pairs of contacts which have been designated as 122a and 122b. The two switches 120, 122, are controlled by an armature that moves through an induction coil 124.

A thermostatic switch 126 is provided in the control system and is responsive to the actual temperature of evaporator 30.

A power conductor 128 extends from one pole of battery 84 to switches 78a and 80a, and has several branches extending to contacts of the three relays. A conductor 130 extends between switches 80a and 82a. A conductor 134 extends between switch 78a and the induction coil 108 of relay 104. A conductor 136 extends from switch 82a to the induction coil 116 of relay 110. A conductor 138 extends between one contact of relay 104 and a similar contact of relay 110, and this conductor has a branch that extends to the induction coil 124 of relay 118. A conductor 140 extends from the power conductor 128 to one pole of coil 42 of valve 36. A conductor 142 extends from the other pole of coil 42 to one contact of switch 120 of relay 118. A branch 144 of said conductor 142 joins one of the upper contacts of switch 112 of relay 110. A conductor 146 extends from the other contact of switch 120 in relay 118 to the thermostatic switch 126. A conductor 148 extends from one of the contacts 122b to coil 50 of the speed control device 46. A conductor 150 extends from one of the contacts 122a to the induction coil 101 of the damper control motor.

The operation of the system disclosed in FIG. 4 will now be explained. Member 74 of the thermostat 52a is pre-set with respect the arcuate member 72. If the setting is below a predetermined temperature, such as 28° F., representing the maximum temperature for some products, such as frozen foods, switch 82a would be held in an open position by cam 102, but if the setting is above 28° F., as might be occasioned when fresh vegetables or meat is in shipment, switch 82a remains normally closed. During the pull-down of the temperature in space 10a, switch 78a is closed and switch 80a is open. The closing of switch 78a energizes the coil 108 of the cooling relay 104 to close switch 106. The closing of switch 106 completes a circuit from the power conductor 128 through switch 106 and conductor 138 to the coil 124 of relay 118. The energizing of relay 118 closes switch 122 with respect the lower set of contacts 122b. This completes a circuit with the engine throttle motor 48 and 50 of the speed control device 46, and in the example of FIG. 4, causing engine 44 to operate at full speed. Under these conditions, the dampers 98 are open and air is circulated relative to the evaporator 30 by fan 96 to cool the space 10a. When the pre-set temperature of thermostat 52a has been reached, the movement of member 78 relative to switch 78a opens the latter switch, thereby breaking the circuit through conductor 134 to de-energize both the cooling relay 104 and relay 118. When the coil 124 of relay 118 is de-energized, the armature moves upwardly to bring switch 120 into engagement with its pair of contacts, and also bring switch 122 into engagement with the upper contacts 122a. This completes two new circuits; one to the damper coil 101, and the other to valve coil 42 that may be traced as follows: From the power conductor 128, a first circuit is completed through switch 122 and its contacts 122a through conductor 150 to coil 101 and thence to ground, and another circuit is completed from conductor 128, through conductor 140 to coil 42, from which current returns through conductor 142 to the contacts of switch 120, and then through conductor 146 to the thermostatic switch 126 and thence to ground. Switch 126 is normally closed when evaporator 30 is in its cooling condition. Also, since de-energizing relay 118 breaks the circuit to coil 50, the engine 44 is caused to operate at reduced speed, and with the dampers 98 closed and valve 36 open, hot gas is permitted to flow from the high pressure side of the system through conduit 34 to convert the evaporator to a heating heat exchanger. With dampers 98 in a closed position, the fan 96 becomes ineffective to circulate air from the enclosure relative to the heat exchanger 30 and thereby avoiding the circulation of warmer air over the products in said enclosure. When the temperature of the evaporator coil 30 reaches a predetermined higher temperature, such as 50° F., the temperature responsive switch 126 opens to thereby break the circuit to the coil 42 of valve 36, and once again the evaporator 30 becomes a cooling heat exchanger with respect to the space directly affected by evaporator 30, but since dampers 98 remain closed, none of the air is circulated into space 10a. As the temperature of the evaporator coil 30 descends to a pre-set temperature of substantially 26° F., the thermostatic switch 126 again closes to complete a circuit to the coil 42 of the valve 36, whence hot gas is again admitted to the evaporator to repeat the heating cycle under the control of switch 126. In the event that the ambient temperature is not much above the temperature setting of member 74, this cycling will continue indefinitely with the dampers in a closed position. If following this action, the temperature in the space 10a rises as a result of ambient heat leakage, or because of the existence of a warm product, a rise in temperature in space 10a occurs and will cause the closing of switch 78a, whence the space is again cooled.

In the event member 74 of the thermostat 52a has been set for a temperature above 28° F., switch 82a remains closed, and if the temperature in space 10a falls below the set temperature, then switch 78a is open and switch 80a closes. With the closing of switch 80a, a new circuit is established which may be traced as follows: From the power conductor 128 through switch 80a, conductor 130, switch 82a and conductor 136 to the coil 116 of the heating relay 110. When relay 110 is energized, a circuit is established from the power conductor 128 through switch 114 to coil 124 of relay 118, and through switch 112 to the branch conductor 144. The closing of switch 122 with its lower contact 122b closes a circuit to the engine speed control device 46 to cause the engine to run at full speed, and a circuit is also closed through conductor 140, coil 42, and the branch conductor 144 to switch 112 and thence to ground, so as to open the hot gas valve 36, whence heat is supplied to the space 10a with the dampers 98 in an open position to thereby rapidly raise the temperature within space 10a. When as a result of continued operation under this condition the temperature rises in the space, member 64 moves to the right to open switch 80a thereby de-energizing the heating relay 110, and the system goes back to its cyclic operation described heretofore with the dampers 98 closed.

If the product being carried in space 10a is frozen foods or some product where a low temperature is not critical, switch 82a is mechanicaly opened by engagement of the cam 102 and the system is thereby prevented from going into the heating cycle, regardless of how low the temperature drops in space 10a.

Each modification of the invention has certain distinct advantages. The modification of the invention disclosed in FIG. 4 is particularly adapted for use in mechanically refrigerated railway cars where there is apt to be substantial vibration, for the several relays assure circuits that cannot be broken due to jarring. The prime mover may be either a spark ignition type of engine or a compression ignition type of engine. Where a compression ignition or Diesel type engine is used, for reliable operation the engine should always work under a load, and that condition is particularly true in this modification, for whether the system is heating or cooling, the power required to operate the compressor is sufficient to provide a continuous load on the engine. By terminating the circulation of air between the product space and the heat exchanger when a desired temperature range is attained, the temperature of the product remains substantially constant.

The modification disclosed in FIG. 1 has many of the advantages discussed heretofore, and the system, being of a simpler nature has broad application insofar as its use is concerned.

This application is related to Ser. No. 472,573, now Patent No. 2,926,005, dated February 23, 1960, also assigned to the present assignee.

It will be obvious to those skilled in the art that my invention may be modified by many substitutions and equivalents, and the disclosures herein are intended to be illustrative only. Therefore, the invention is limited solely by the scope of the appended claims.

I claim:

1. Apparatus for maintaining a substantially constant temperature within an enclosed space, comprising a mechanical refrigerating system including a high pressure side and a normally low pressure side, said normally low pressure side disposed in heat exchange relationship with said space, conduit means connecting said high and normally low pressure sides, a two-position valve operatively associated with said conduit means, a compressor disposed in said system, a continuously operated prime mover operatively connected to said compressor, a control device operatively associated with said prime mover and adapted to regulate the operation thereof between a high speed and a lower speed, a motor operatively associated with said control device, a second motor operatively connected to said valve, a circuit including both of said motors, at least two switches in said circuit each independently controlling one of said motors, and a single thermostat responsive to the temperature of said space for controlling both of said switches.

2. Apparatus for maintaining a substantially constant temperature within an enclosed space, comprising a mechanical refrigerating system including a high pressure side and a normally low pressure side, said normally low pressure side disposed in heat exchange relationship with said space, conduit means connecting said high and normally low pressure sides, a two-position valve operatively associated with said conduit means, a compressor disposed in said system, a continuously operated prime mover operatively connected to said compressor, a control device operatively associated with said prime mover and adapted to regulate the operation thereof between a high speed and a lower speed, a motor operatively associated with said control device, a second motor operatively connected to said valve, a circuit including both of said motors, a first switch in said circuit operatively connected to the motor of said control device and when actuated effects change of speed of said prime mover, a second switch in said circuit operatively connected to the motor of said valve and when actuated permits heated refrigerant to flow to said normally low pressure side and a single thermostat adapted to sequentially actuate said switches on changes of temperature in said space.

3. Apparatus for maintaining a substantially constant temperature within an enclosed space, comprising a mechanical refrigerating system including a high pressure side and a normally low pressure side, said normally low pressure side disposed in heat exchange relationship with said space, conduit means connecting said high and normally low pressure sides, a two-position valve operatively associated with said conduit means, a compressor disposed in said system, a continuously operated prime mover operatively connected to said compressor, a control device operatively associated with said prime mover and adapted to regulate the operation thereof between a high speed and a lower speed, a motor operatively associated with said control device, a second motor operatively connected to said valve, a circuit including both of said motors, a first switch in said circuit operatively connected to the motor of said speed control device and when actuated effects change of speed of said prime mover, a second switch in said circuit operatively connected to the motor of said valve and when actuated permits heated refrigerant to flow to said normally low pressure side, a third switch in said circuit which when actuated following the sequential actuation of said first and second switches re-establishes the original speed of said prime mover, and a single thermostat adapted to sequentially actuate said switches on changes of temperature in said space.

4. Apparatus for maintaining a substantially constant temperature within an enclosed space, comprising a mechanical refrigerating system including a high pressure side and a normally low pressure side, said normally low pressure side disposed in heat exchange relationship with said space, conduit means connecting said high and normally low pressure sides, a two-position valve operatively associated with said conduit means, a compressor disposed in said system, a continuously operated internal combustion engine operatively connected to said compressor, a throttle control device operatively associated with said engine and adapted to regulate the operation thereof between a high speed and a single lower speed, a solenoid controlling said control device, a second solenoid controlling said valve, a circuit including both of said solenoids, at least two switches in said circuit each independently controlling one of said solenoids, a member supporting said switches in spaced relation to each other, a second member supported adajcent said first member to sequentially engage said switches on pivotal movement of one member relative to the other member, and thermostatic means responsive to the temperature of said space for moving one of said members relative to the other member.

5. In a refrigeration control system, comprising a two-position engine throttle control device, a two-position fluid flow control device, a solenoid operator connected to each of said control devices, a circuit including both of said solenoid operators, a first switch in said circuit controlling the solenoid of said throttle control device, a second switch in said circuit controlling said fluid control device, a third switch in said circuit which when actuated following the sequential actuation of said first and second switches renders the first named switch ineffective to control said throttle control device, a member supporting said three switches in substantial alignment with each other, a second member supported for pivotal movement relative to said first named member and when moved relative to said first named member effects sequential actuation of said switches in the order named, and a thermal motor operatively connected to said last named member to produce pivotal movement of said pivotally mounted member relative to the switch carrying member.

6. Apparatus for maintaining a substantially constant temperature within an enclosed space, comprising a mechanical refrigerating system including a high pressure side and a normally low pressure side, said normally low pressure side disposed in heat exchange relationship with said space, conduit means connecting said high and normally low pressure sides, a two-position valve operatively associated with said conduit means, a compressor disposed in said system, a continuously operated prime mover operatively connected to said compressor, a speed control device operatively associated with said prime mover and adapted to regulate the operation thereof between a high speed and a lower speed, means controlling the flow of air within said space relative to said normally low pressure side, a first motor operatively associated with said speed control device, a second motor operatively connected to said valve, a third motor operatively connected with said air flow control means, a circuit including all of said motors, at least three switches in said circuit each independently controlling one of said motors, and a single thermostat responsive to changes in temperature of said space for sequentially controlling the actuation of said switches.

7. A method of establishing a substantially constant temperature within an enclosed space, comprising the steps of providing heat exchange with respect to said space at a relatively high rate when the space temperature is at a substantial variance with a predetermined degree of temperature until the space temperature is in substantial conformity with said predetermined degree of temperature, and then maintaining said space temperature at a degree approximating said predetermined degree by continuously and alternately heating and cooling said space at a reduced rate to temperatures approximating said predetermined degree, the rate of said alternate heating and cooling being sufficient to offset an excess of cooling or heating respectively, and any change in said space temperature brought about by a condition foreign to said heat exchange.

8. A method of establishing a substantially constant temperature within an enclosed space, comprising the steps of reducing temperature of said space at a relatively high rate when the space temperature is substantially above a predetermined degree of temperature and until the space temperature is in substantial conformity with said predetermined degree of temperature, and then maintaining said space temperature at a degree approximating said predetermined degree by continuously and alternately heating and cooling said space at a reduced rate to temperatures approximating said predetermined degree, the rate of said alternate heating and cooling being sufficient to offset an excess of heating or cooling respectively and any change in said space temperature brought about by a condition foreign to said heat exchange.

References Cited in the file of this patent
UNITED STATES PATENTS

| | | |
|---|---|---|
| Re. 23,000 | Jones | May 11, 1948 |
| 2,143,687 | Crago | Jan. 10, 1939 |
| 2,187,397 | Goggins | Jan. 16, 1940 |
| 2,191,102 | Zerk et al. | Feb. 20, 1940 |
| 2,216,690 | Madden | Oct. 1, 1940 |
| 2,241,070 | McLenegan | May 6, 1941 |
| 2,243,615 | Werner et al. | May 27, 1941 |
| 2,344,215 | Soling et al. | Mar. 14, 1944 |
| 2,742,765 | Anderson | Apr. 24, 1956 |
| 2,762,229 | Coning et al. | Sept. 11, 1956 |